(12) United States Patent  (10) Patent No.: US 8,302,452 B2
Golorans et al.  (45) Date of Patent: Nov. 6, 2012

(54) MECHANICAL PRESS DRIVE SYSTEM AND METHOD

(75) Inventors: Marc Segura Golorans, Barcelona (ES); Sjoerd G. Bosga, Västerås (SE)

(73) Assignee: ABB Research Ltd., Zürich (CH)

( * ) Notice: Subject to any disclaimer, the term of this patent is extended or adjusted under 35 U.S.C. 154(b) by 1128 days.

(21) Appl. No.: 12/278,391

(22) PCT Filed: Jun. 8, 2006

(86) PCT No.: PCT/IB2006/001512
§ 371 (c)(1),
(2), (4) Date: Aug. 5, 2008

(87) PCT Pub. No.: WO2007/091118
PCT Pub. Date: Aug. 16, 2007

(65) Prior Publication Data
US 2009/0007622 A1  Jan. 8, 2009

Related U.S. Application Data

(60) Provisional application No. 60/765,182, filed on Feb. 6, 2006, provisional application No. 60/765,183, filed on Feb. 6, 2006.

(30) Foreign Application Priority Data

Apr. 4, 2006  (WO) ................ PCT/SE2006/050055

(51) Int. Cl.
*B21J 7/46* (2006.01)
(52) U.S. Cl. ............................. 72/443; 72/20.2; 72/452.5
(58) Field of Classification Search ............... 72/17.1, 72/17.2, 20.1, 20.2, 20.4, 21.1, 21.3, 441, 72/443, 446, 449, 450, 454, 452.5; 475/1, 475/2, 5, 149, 154; 100/48, 50, 52, 99, 273
See application file for complete search history.

(56) References Cited

U.S. PATENT DOCUMENTS 4,246,523 A * 1/1981 Nagai .......................... 318/369
(Continued)

FOREIGN PATENT DOCUMENTS

DE  884278 C  7/1953
(Continued)

OTHER PUBLICATIONS

Dennis Boerger; High-tech presses, Servo technology meets mechanical presses, Stamping Journal, Nov. 2003.
(Continued)

*Primary Examiner* — Edward Tolan
(74) *Attorney, Agent, or Firm* — Venable LLP; Eric J. Franklin

(57) ABSTRACT

A method for operating a mechanical press including at least one electric drive motor, a drive control for controlling the at least one motor, a ram, a mechanical element for translating rotational motion of the at least one motor to linear motion of the ram in a first rotation direction, into a linear motion of the ram arranged to be lowered and raised along a linear path for operating the press to carry out a press cycle including a pressing part and one or more non-pressing parts of the press cycle, and by providing a control output to the drive control such that the speed of the at least one drive motor is varied during at least one pressing or non-pressing part of the press cycle. The press may be reversed between production cycles. Also press and system including a such press.

54 Claims, 8 Drawing Sheets

U.S. PATENT DOCUMENTS

| | | | | |
|---|---|---|---|---|
| 4,653,311 | A * | 3/1987 | Tack, Jr. | 72/443 |
| 5,253,572 | A * | 10/1993 | Uehara et al. | 100/48 |
| 5,289,096 | A * | 2/1994 | Takeda | 318/560 |
| 5,588,344 | A | 12/1996 | Chun | |
| 5,852,970 | A * | 12/1998 | Bornhorst et al. | 100/346 |
| 5,921,125 | A * | 7/1999 | Inoue et al. | 72/20.2 |
| 6,145,366 | A * | 11/2000 | Yamada | 72/443 |
| 6,178,803 | B1 * | 1/2001 | Ozaki et al. | 72/443 |
| 6,182,492 | B1 * | 2/2001 | Raffin et al. | 72/454 |
| 6,193,625 | B1 * | 2/2001 | Ullrich et al. | 475/5 |
| 6,242,877 | B1 | 6/2001 | Irwin et al. | |
| 6,443,867 | B1 | 9/2002 | Fahrenbach | |
| 6,520,077 | B1 | 2/2003 | Minagawa et al. | |
| 6,619,088 | B1 | 9/2003 | Oyamada et al. | |
| 7,004,006 | B2 * | 2/2006 | Nagae | 72/450 |
| 7,082,809 | B2 * | 8/2006 | Balasu | 72/454 |
| 7,086,262 | B2 * | 8/2006 | Suzuki et al. | 72/20.1 |
| 7,124,491 | B2 * | 10/2006 | Toeniskoetter et al. | 29/434 |
| 7,187,996 | B2 * | 3/2007 | Tanaka et al. | 700/206 |
| 7,353,686 | B2 * | 4/2008 | Kanemitsu et al. | 72/454 |
| 7,434,505 | B2 * | 10/2008 | Suzuki et al. | 100/43 |
| 2004/0003729 | A1 | 1/2004 | Aoshima | |
| 2004/0240981 | A1 | 12/2004 | Dothan et al. | |

FOREIGN PATENT DOCUMENTS

| | | |
|---|---|---|
| DE | 905700 C | 3/1954 |
| DE | 4421527 A1 | 12/1995 |
| DE | 10358991 A1 | 7/2004 |
| EP | 0434632 A2 | 6/1991 |
| EP | 0561604 A1 | 9/1993 |
| EP | 1126581 A2 | 8/2001 |
| EP | 1281508 A | 2/2003 |
| EP | 1640145 A | 3/2006 |
| GB | 2258186 A | 2/1993 |
| JP | 8108229 A | 4/1996 |
| JP | 20011191134 A | 7/2001 |
| WO | WO-2004056559 A | 7/2004 |

OTHER PUBLICATIONS

PCT/ISA/210—International Search Report—Oct. 11, 2006.

PCT/ISA/237—Written Opinion of the International Searching Authority—Feb. 6, 2006.

PCT/IPEA/409—International Preliminary Report on Patentability—Feb. 6, 2006.

* cited by examiner

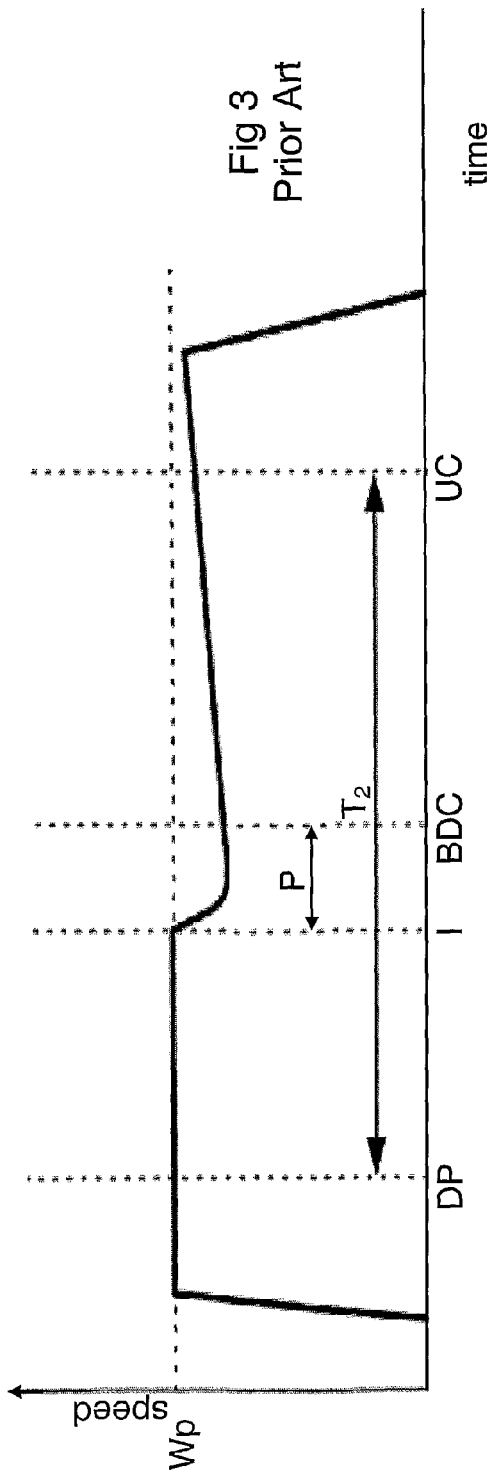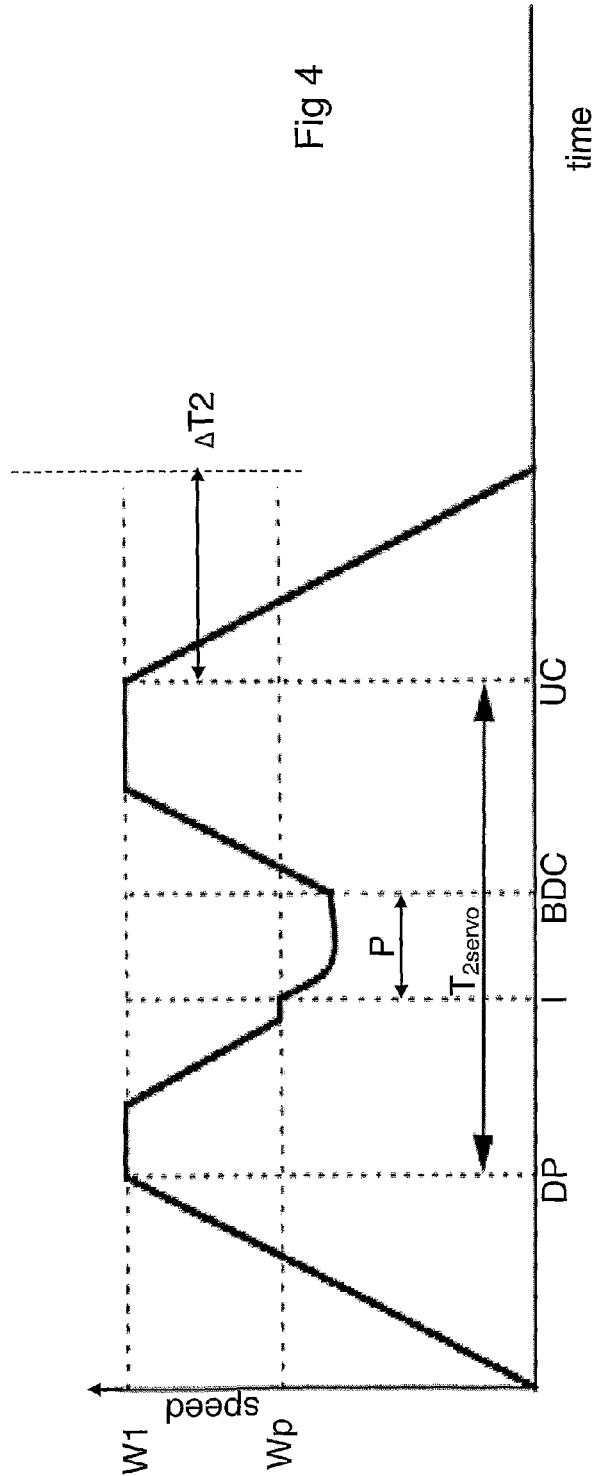

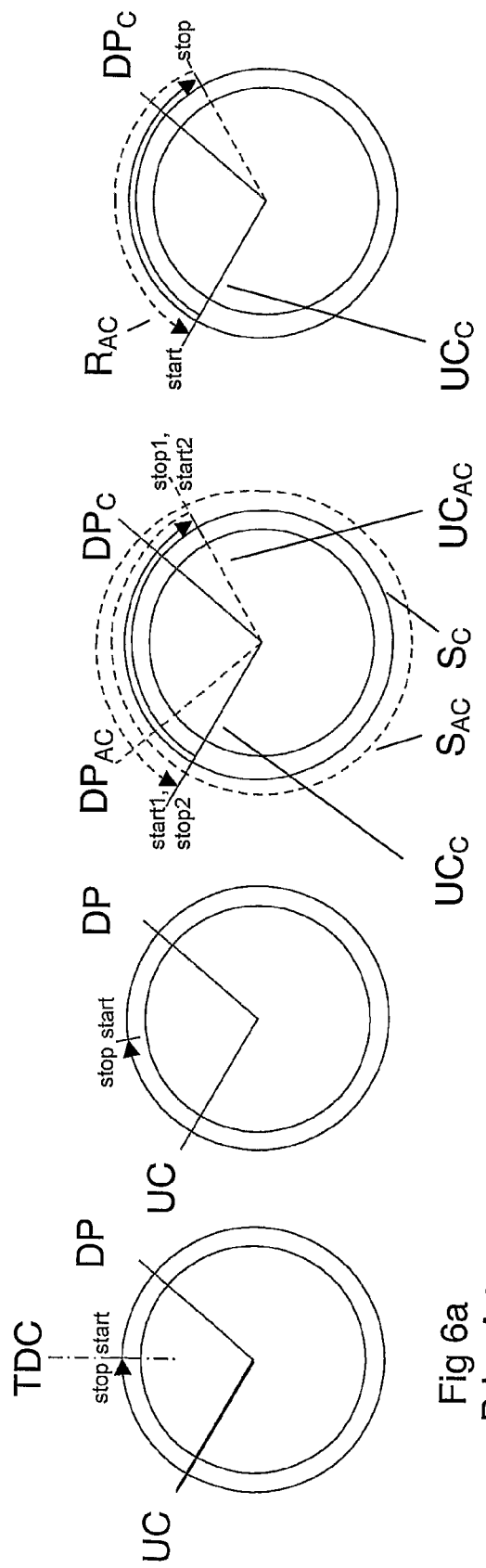

MECHANICAL PRESS DRIVE SYSTEM AND METHOD

CROSS-REFERENCE TO RELATED APPLICATIONS

This application claims priority to U.S. provisional patent application 60/765,182 filed 6 Feb. 2006, U.S. provisional patent application 60/765,183 filed 6 Feb. 2006 and international patent application PCT/SE2006/050055 filed 4 Apr. 2006 and is the national phase under 35 U.S.C. §371 of PCT/IB2006/001512 filed 8 Jun. 2008.

TECHNICAL FIELD

The invention concerns a mechanical press of the type used for pressings, stamping or punching of metal parts from blanks. In particular, the invention discloses a mechanical press driven by an electric motor with an improved system controlling transmission of power from the drive motor to the ram of the press.

TECHNICAL BACKGROUND

Mechanical presses are commonly used to produce stamped car parts from steel blanks or workpieces. Traditionally the press drive and power transmission system, or kinematics is driven via a flywheel. The function of the flywheel is to store the necessary energy to make a cycle. The flywheel is connected and disconnected to the kinematics by means of a clutch and brake system (which may be pneumatic or hydraulic). When a die or mould of such presses is to be changed, the setup involving setting the mechanical positions to compensate for wear over time etc. is usually a complicated and lengthy process including mechanical adjustments that require a great deal of skill and knowledge. Maintenance is also required for any clutch or brake in the drive chain.

In addition, once setup to run with a given die, the working cycles of traditional motor driven mechanical presses, link presses, crank presses and similar are fixed. For example once the speed of the flywheel is set and the clutch engaged, the press will move following a fixed pattern, such as that of FIGS. 3, 5 (Prior Art) repeated as many times as required. Press speed is described here in terms of a rotational speed of the motor or of a mechanical transmission part such as an eccentric, or linear speed of the press ram. Having a fixed cycle means that any adjustment to, or optimization of, the press working cycle requires an interruption of production and adjustment of the mechanical components of the drive transmission, the flywheel etc. in order to modify the press cycle or cycle time. FIG. 3 (Prior Art) shows a general diagram for a press production cycle of a traditional mechanical press, a speed profile, expressed in terms of an eccentric speed Wp against time. Production cycle time, the total time for a complete production cycle from start to finish and including a press cycle, normally includes a short acceleration time at the beginning of the press cycle up to pressing speed Wp, a time period at constant pressing speed Wp, a time period P during the actual pressing operation when speed normally drops, a time after pressing during which speed gradually increases back to pressing speed, and finally a time period of deceleration or braking when the press is brought to a standstill at the end of the press cycle. Finally and usually when the press is being unloaded and re-loaded, the press normally remains at a standstill for a period of time. The production cycle thus begins with the start of a press cycle and ends at the end of a press cycle plus any standstill time.

The press is normally brought to a standstill by mechanical braking. FIG. 5 (Prior Art) shows a general position profile diagram including a complete production cycle expressed in terms of ram or slide position against time. The position profile shows a cycle which begins with ram position at Top Dead Centre (TDC) and the ram then accelerating to a lower position until a pressing stage P beginning with point of impact I between press die and workpiece. The ram continues to move downward to Bottom Dead Centre (BDC), the lowest ram position, press fully closed. After BDC the ram is accelerated back up toward TDC at which point it is in a fully open position again.

U.S. Pat. No. 6,619,088 to Oyamada entitled Bottom Dead Centre Correction Device for Press Servo Machine describes a bottom dead centre correction device for a servo press machine in which a slide is raised and lowered with a servo motor as the power source. Such a press has the advantage of not requiring a flywheel to provide energy for a pressing or stamping operation. A press with this type of transmission generally has a high peak power requirement. However, the device shown has a ball-screw drive which type of transmission up till now has usually been limited in the amount of force that may be transmitted and limited by cost of manufacture to small presses and/or for stamped products of high value.

It is known from the publicity material of Aida-America Corporation to drive a mechanical press using a servo motor with a direct drive to the slide mechanism (Ref 1.) This type of servo press with a direct drive has the advantage of requiring no flywheel, clutch or brake and having a programmable slide motion. However, servo motor presses may have a high peak power consumption for some products, especially large products requiring deep drawing.

SUMMARY OF THE INVENTION

According to one or more embodiments of the present invention an improvement is provided to methods for operating a mechanical press comprising at least one electric drive motor, a drive control means for controlling the motor, a press ram, and a mechanical means for translating rotational motion of said motor to linear motion of said ram arranged to be lowered and raised along a linear path for operating said press to carry out a production cycle including a pressing part and one or more non-pressing parts of said cycle, characterized by providing a control output to said drive control means wherein the speed of said drive motor is varied during at least one part of a said production cycle.

According to another aspect of an embodiment of the invention improvements are provided in the form of a method for a mechanical press comprising providing a control output to said drive control means wherein the speed of at least one said drive motor during the at least one part of a production cycle is controlled to vary and may be greater than the speed of said drive motor during said pressing part of the cycle.

According to another aspect of an embodiment of the invention improvements are provided in the form of a method for a mechanical press comprising providing a control output to said drive control means wherein the speed of at least one said drive motor between the start of said production cycle and said pressing part of the cycle is variably controlled and reaches a speed greater than the speed of said drive motor during said pressing part of the cycle.

According to one or more embodiments of the present invention an improvement is provided to methods for operating a mechanical press comprising at least one electric drive motor, a drive control means for controlling the motor, a press ram, a crank member or eccentric for translating rotational motion of said motor to linear motion of said ram arranged to be lowered and raised along a linear path for operating said press, and by means of the improvement providing a control output to said drive control means wherein each press cycle of each complete production cycle carried out in a first rotation direction extends over more than 360 degrees of crank angle rotation.

According to another aspect of an embodiment of the invention improvements are provided in the form of a method for a mechanical press comprising providing a control output to control at least one said motor to accelerate during a first part of the press cycle and before reaching or otherwise dependent on a position equivalent to a die protection angle relative the press cycle to a speed which may be in excess of the pressing speed.

According to another aspect of an embodiment of the invention improvements are provided in the form of a method for a mechanical press comprising providing a control output to said drive control means wherein the motor speed is reduced from a high or maximum speed to a pressing speed prior to the Impact angle or position of first contact between the die and the workpiece.

According to another aspect of an embodiment of the invention improvements are provided in the form of a method for a mechanical press comprising providing a control output to said drive control means wherein said motor speed is variably controlled during a time period while the press opening is between a point of first impact with the workpiece and Bottom Dead Centre (BDC) or thereabouts.

According to another embodiment of the invention improvements are provided in the form of a method for a mechanical press comprising providing a control output to said drive control means wherein said motor speed is variably controlled to stop for a period of time upon reaching Bottom Dead Centre (BDC) or thereabouts for example for hot stamping.

According to another embodiment of the invention improvements are provided in the form of a method for a mechanical press comprising providing a control output to said drive control means wherein said motor speed is variably controlled to increase upon reaching Bottom Dead Centre (BDC) or thereabouts.

According to another aspect of an embodiment of the invention improvements are provided in the form of a method for a mechanical press comprising decelerating said motor from a deceleration position in the press cycle after reaching or otherwise dependent on an unload cam (UC) angle of the press cycle.

According to another aspect of an embodiment of the invention improvements are provided in the form of a method for a mechanical press comprising decelerating said motor and stopping the press cycle in the first direction at a stop position with a crank angle of greater than 360 or twice past Top Dead Centre (TDC).

According to one or more embodiments of the present invention an improvement is provided to methods for operating a mechanical press comprising at least one electric drive motor, a drive control means for controlling the motor, a press ram, a crank member for translating rotational motion of said motor to linear motion of said ram arranged to be lowered and raised along a linear path for operating said press, and by means of the improvement providing a control output to said drive control means wherein at least one said drive motor may be reversed in a second rotational direction at the end of each complete said production cycle.

According to another aspect of an embodiment of the invention improvements are provided in the form of a method for a mechanical press comprising providing a control output to said drive control means wherein said motor is accelerated from a start up position of before or less than 0 degrees, or before Top Dead Centre (TDC), and passes through TDC twice during a press cycle in the first rotation direction.

According to another embodiment of the invention improvements are provided in the form of a method for a mechanical press comprising providing a control output to said drive control means to move said ram to a cycle start position for each press cycle which is a plurality of degrees of crank angle backwards in a second rotation direction when compared to the stop position of a previous production cycle in the first rotation direction.

According to another embodiment of the invention improvements are provided in the form of a method for a mechanical press comprising providing a control output to said drive control means wherein said motor rotational motion reverses direction from the first rotation direction to a second rotation direction between each successive and complete production cycle.

According to another aspect of an embodiment of the invention improvements are provided in the form of a method for a mechanical press comprising providing a control output to said drive control means wherein said motor is accelerated from a start up position of less than 0 degrees or Top Dead Centre (TDC) crank angle in the first rotation direction during a first production cycle and accelerated from a start position of greater than 360 degrees or TDC during a second production cycle in the second rotation direction.

According to another aspect of an embodiment of the invention improvements are provided in the form of a method for a mechanical press comprising providing a control output to said drive control means wherein said motor is decelerated from a deceleration position of before 0 degrees or before reaching TDC, in the first rotation direction during the first production cycle and decelerated from a deceleration position of greater than 360 degrees and before reaching TDC, during a second production cycle in the second and opposite rotation direction.

According to another embodiment of the invention improvements are provided in the form of a mechanical press comprising an electric drive motor, a drive control means for controlling the motor, a press ram, and a member for translating rotational motion of said motor to linear motion of said press ram arranged to be lowered and raised along a linear path for operating said press, wherein by means of the improvement providing said drive control with means arranged to control the motor to provide a complete production cycle comprising a rotation of the member for translating rotational motion in a first rotation direction of greater than 360 degrees, and that means such that the rotation direction of said motor is arranged to be reversible.

According to another aspect of an embodiment of the invention improvements are provided in the form of a mechanical press comprising computer program or software means arranged for reversing the rotational direction of the motor following after a complete production cycle in the first direction.

According to another aspect of an embodiment of the invention improvements are provided in the form of a mechanical press comprising an electric motor and where said press comprises position sensor means for determining an eccentric rotation angle, a crank rotation angle or a linear position of the ram in the press.

According to another embodiment of the invention improvements are provided in the form of a mechanical press comprising a motor where said press may comprise sensor means comprised in said motor for determining a position or speed of a shaft of the motor.

According to another embodiment of the invention improvements are provided in the form of a mechanical press comprising means in said control means or in a control unit for measuring or otherwise determining the speed of said motor.

According to another embodiment of the invention improvements are provided in the form a mechanical press wherein said mechanical means for translating rotational motion of the at least one said motor to linear motion of said ram comprises any transmission type from the group of: crank, knuckle, link, cam, screw, ball screw, rack-type mechanism.

According to another embodiment of the invention improvements are provided in the form a mechanical press wherein the inertia of the rotating mass is adapted by means in part of a variation in the inertia of any moving part of the press, such as a motor, a press gear, a gearbox or a flywheel. The variation in the inertia of a moving part of the press may be carried out on-line or off-line, for example by means of engaging or disengaging a clutch or coupling device. The moving part of the press with which the variation in inertia may be accomplished may be driven by a motor.

The invention comprises an improved mechanical press comprising at least one electric motor, and a motor control means such as a frequency converter and mechanical couplings specifically designed to be able to run a mechanical press without the need for the relatively great amount of energy storage that is normally provided by a flywheel, a method for operating said press, and a system comprising a said press. For the purposes of driving the press in a production cycle, the flywheel, clutch and preferably also the brake can all be removed from a traditional mechanical press and the motor can be connected directly to the press kinematics or link mechanism. The direct drive between motor and crank (or ram) enables the speed of the press along the slide stroke to be dynamically controlled during different parts of a press cycle. Parts of a press cycle such as: before the moving die contacts the workpiece or blank to be pressed; after die closing and during a part-cycle in which the workpiece is being pressed; and after die opening again and during the part-cycle between end of pressing and start of pressing the next workpiece.

The improved motor drive and control method allows the motor speed during such parts of a total production cycle to be varied, something which is not possible for flywheel presses of the prior art. The motor speed may even be varied in a continuous manner so that motor speed and/or ram speed are not limited to one or more predetermined speeds. In contrast to prior art presses, the motor speed is variable between zero and a maximum speed providing a rotational speed W1 of the eccentric which may be greater than the pressing speed Wp of the eccentric. In the prior art mechanical presses with a flywheel are limited to a fixed crankshaft speed because the flywheel speed is normally more-or-less constant.

In an embodiment of the invention the required dimensions of the motor of the improved press are reduced by arranging the press and the press control to allow the motor a greater part of the press cycle in which to accelerate up to the required speed(s). In one or more advantageous embodiments the improved press control methods are so arranged that a complete press cycle is provided which is in excess of the traditional 360 degree crank rotation angle, or in terms of TDC position twice past TDC, and may yet still have a shorter total production cycle time for the complete production press cycle when compared to flywheel-based mechanical presses of similar tonnage. The press cycle comprising a crank angle rotation of more than 360 degrees may be achieved in either of at least two ways, as described in detail below.

Summarily these methods comprise reversing a press at the end of a cycle and either starting the next cycle from a position before the stop position of the previous cycle; or, by reversing a press at the end of the cycle and running the following complete cycle in the reverse direction to the direction of rotation of the first press cycle.

The principal advantage of the improved press is that the motor speed may be variably controlled during a production cycle. This allows a degree of control and operational accuracy that is not available in todays mechanical presses such as flywheel presses. The advantage gained is that the total time for a production cycle with the improved press may be reduced compared to a production cycle time for an equivalent mechanical, flywheel-type press.

Another advantage of the improved press is that it may be controlled so that the peak power required during a downstroke is reduced. This is achieved in one embodiment by starting and stopping the press cycle at a non 0, non-360 degree point in the press cycle. Another advantage is that the operation of the press may be controlled dynamically, with the option of varying the speed during a press work cycle. This controllability means firstly that with a given kinematic, the press can perform a preset cycle pattern to optimize the stamping process and/or automation opening times etc. This means that a mechanical press would gain the main feature that mainly only a hydraulic press has: to be able to control speed in a variable fashion during the parts of a total production cycle before or after the actual pressing phase in the production cycle.

Typically the preferred advantage compared to a traditional mechanical press is a shortened production cycle time. However the speed of the motor may also be varied as necessary during any part of the press cycle and also meet as required, a constraint that the pressing time and cycle time between loading-pressing-unloading does not vary. When compared to traditional mechanical presses advantages of the invention may include:

Controllability: while a preset motion would be appropriate during the stamping process part of a press cycle, a control may be applied during the rest of the motion cycle. The following advantages and features can thus be obtained:

increased speed during opening/closing the press (while for example maintaining original speed during the stamping part of the cycle), resulting in reduced cycle times, adapting the speed profile using speed control to reduce audible noise, vibration, stresses eg. by reducing the speed just before impact during press closing, reduced inertia in the configuration of the press, reduced inertia also means reduced amount of installed mechanical energy or kinetic energy input in the press providing a safer equipment and reduced mechanical stresses, fewer mechanical adjustments needed and simplifies making adjustments to the press configuration of the pressing stage such as to the pressing speed when correcting for die wear, minimises the necessity for hydraulic presses and presses with complicated link systems, as the inventive motor drive system provides better controllability, more flexibility and reduced setup times.

When compared to known servo presses the advantages include:
- a smaller drive motor for a given press inertia than for a servo press,
- a reduced peak power requirement for the drive motor.

In addition tryouts can be performed on the actual line. For example, slow or gradual press motion such as micro-inching a press during a setup or maintenance operation is easily achieved by means of the variable motor speed control. This in turn also allows new ways of production planning.

Another important advantage is that motion of the inventive press may be adapted to the operation of other machines involved in a production sequence. Press motion may be optimised in relation to other machines in a production sequence when for example workpieces are loaded in the press and/or stamped parts unloaded from the press by transfer devices or other automated devices. Such other machines in the production sequence may be one or more robots. Controlling the press in synchronisation with control of the feeding by automatic feeders, other feeders, robot loaders/unloaders, etc provides the advantage of synchronization of feeder/loader motion and press motion, providing in reduced overall production cycle times without compromising pressing quality.

In production settings where more than one press works in a same or related production process, such as a line of presses, the inventive press provides greater opportunity for optimization of a press line by coordinating the motion of all presses and feeders or transfer mechanisms/unloaders such as loading/unloading robots, in the process or press line. Coordination between presses and/or presses and loaders/unloaders may be achieved by, for example, controlling such a line using a single controller, which is enabled due to the improved controllability of the presses according to one or more embodiments of the invention. Coordination or optimisation may be achieved in part by adapting speed during opening/closing a press (while for example maintaining a required speed and energy output during the pressing/stamping part of the cycle), resulting in a press motion which may be optimised dependent on parameters such as: a state of a downstream process; or a state of an upstream process or another consideration such as overall power or energy consumption; smoothing power consumption peaks in the press line.

In a preferred embodiment of the method of the invention the method may be carried out or controlled by a computing device comprising one or more microprocessor units or computers. The control unit(s) comprises memory means for storing one or more computer programs for carrying out the improved methods for controlling the operation of a mechanical press. Preferably such computer program contains instructions for the processor to perform the method as mentioned above and described in more detail below. In another embodiment the computer program is provided on a computer readable data carrier such as a DVD, an optical or a magnetic data device.

BRIEF DESCRIPTION OF THE DRAWINGS

Embodiments of the invention will now be described, by way of example only, with particular reference to the accompanying drawings in which:

FIG. 3 (Prior Art) is a schematic diagram showing a speed-time profile according to a known press cycle;

FIG. 4 is a schematic diagram showing a speed-time profile for a press cycle of an improved press according to an embodiment of the invention;

FIG. 6a (Prior Art) shows a standard 360 degree press cycle according to a known press cycle;

FIGS. 6b-6d shows in schematic diagrams press cycles in relation to start/stop position and rotation direction according to embodiments of the invention;

DETAILED DESCRIPTION OF THE EMBODIMENTS

Figure 1:
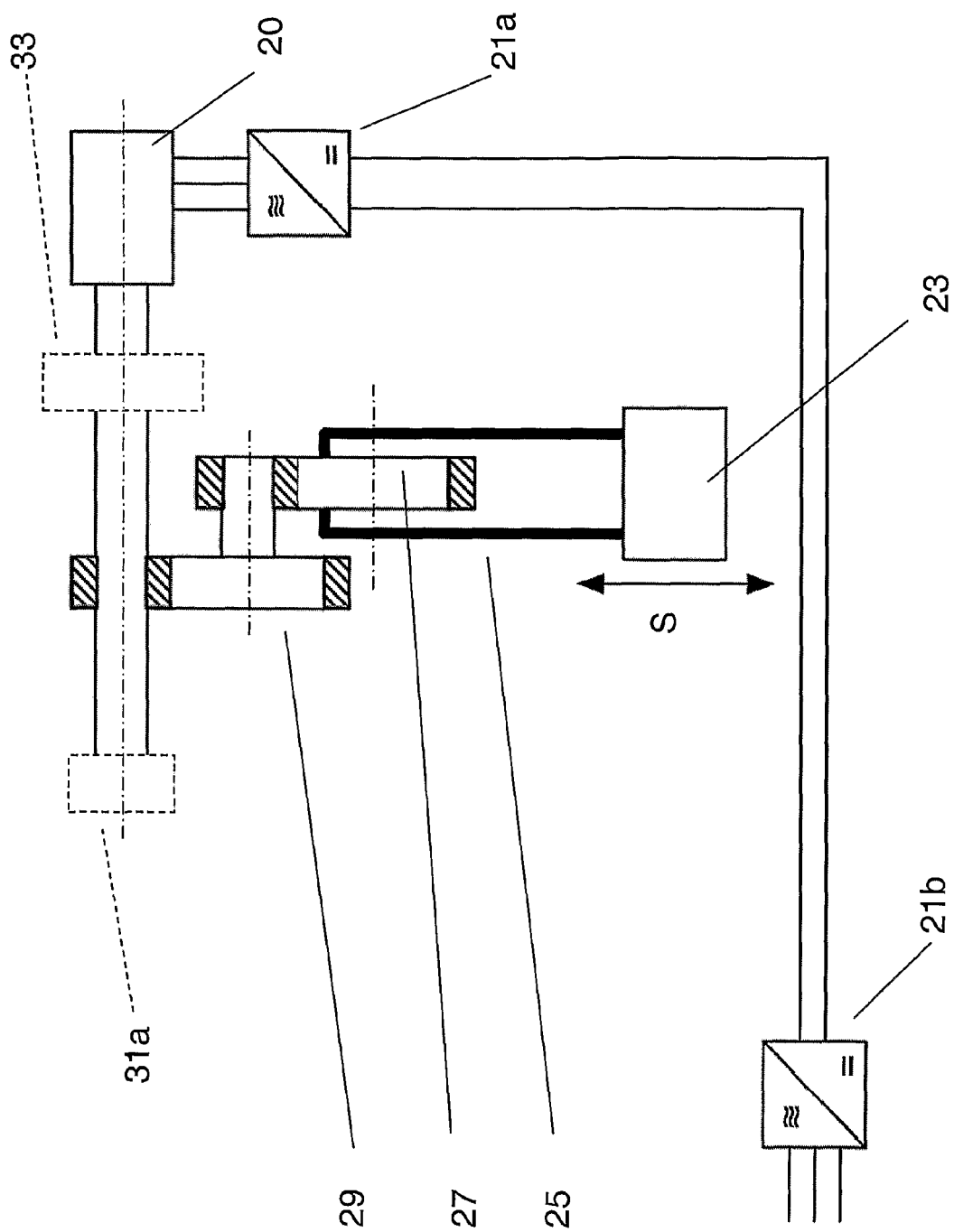
FIG. 1 is a schematic block diagram for an improved mechanical press according to an embodiment of the invention.

FIG. 1 shows a schematic layout for an improved mechanical press according to an embodiment of the invention. It shows in a simplified way a press ram 23, an eccentric drive wheel 27, a press gear mechanism 29, and an electric drive motor 20. It also shows motor power supply and control means 21a and 21b. The figure shows press ram 23 which is driven in a up-and-down motion S by an eccentric drive wheel 27 or crank and a link 25. The eccentric drive wheel is in turn driven by a press gear mechanism 29 which is shown in a simplified cross section in which gear teeth are indicated by cross-hatching. The eccentric wheel is driven through the press gear mechanism by the drive motor 20. Drive motor 20, which may be a servo motor, is arranged with an inverter 21a and a rectifier 21b which are connected to a grid or power network (not shown). Other motor control means may be substituted. The Figure also shows an optional emergency brake 31a and an optional gearbox 33, either of which may be added to the press if so required. It should be observed that this embodiment is not connected to a flywheel via a clutch.

The drive motor may have an AC supply as shown or a DC supply. The motor speed control means may be a frequency converter, an inverter/rectifier as shown or other motor speed control means. The embodiment shown has a relatively large drive motor.

Alternatively a smaller motor is used and arranged in a configuration that comprises extra inertia. The extra inertia may be in the form of a small constantly connected flywheel, or a motor which has high inertia, or a high inertia gearbox 33 or other mechanical means. The extra inertia may also be variable or detachable in some way.

Figure 2:
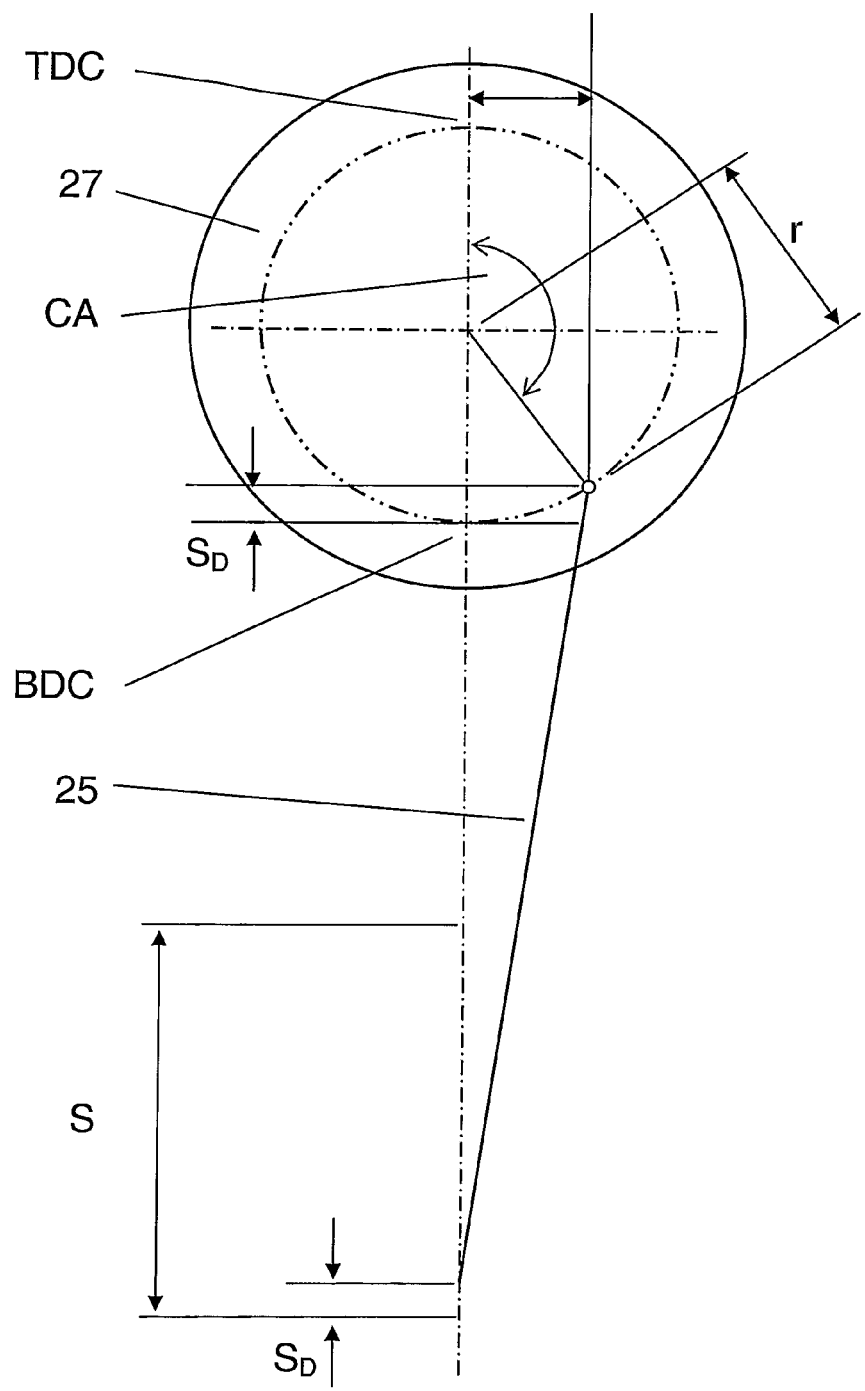
FIG. 2 (Prior Art) is a schematic diagram showing moving and rotating elements of a known mechanical press.

FIG. 2 (Prior Art) illustrates schematically moving and rotating elements of a mechanical press of the crank press type. In this design type, one eccentric wheel or crank is connected to the reciprocating ram by a single rod or link. Multiple eccentric and/or link arrangements are also possible, such as 2-4 eccentric wheels arranged to drive one ram by means of 2 or 4 links. Other mechanical linkages may be substituted to provide power transmission such as knuckle, link, cam, screw or ball screw or rack-type mechanisms are known. For example a ball screw system may be included to transfer a rotary drive motion from a variable speed electric motor in the press into a linear motion of the press slide or ram. Similarly, certain double link and or knuckle mechanisms may also be substituted for an eccentric mechanism.

FIG. 2 shows an eccentric wheel 27 or crank to which a link 25 is pivotably arranged. As the eccentric wheel rotates, the end of the link attached to the eccentric wheel is drawn round a circular path shown as a dash-dot-dot line. At the other end of the link is attached a ram (23, see FIG. 1). The ram rises and falls with a linear stroke S. The angular position of the press in a 360 degree cycle, often called a crank angle CA, is usually taken to be the angle formed between the radius r on which the link lies and a reference such as the vertical centre line shown passing through TDC and BDC. An improved mechanical press may be arranged with more than one variable speed electric motor. These motors may be mechanically connected in parallel to drive a single gear 29. In presses with more than one eccentric wheel, each eccentric wheel may be driven separately using one or more motors for each wheel, with separate gears 29.

FIG. 3 Prior Art is discussed briefly above in the section on Background. It shows a speed profile for a traditional mechanical press. FIG. 4 shows a schematic diagram for at least one press cycle according to an improved method for operating a mechanical press according to an embodiment of the invention. The diagram shows a press cycle in terms of eccentric speed W over time. It shows a press cycle start at zero speed (left of diagram) and a first pre-pressing stage of accelerating to a high or maximum press speed of W1. In a second pre-pressing stage, maximum speed is maintained at W1 for a period of time before the motor is decelerated during a third pre-pressing stage to a selected pressing speed Wp. During the next stage, the pressing stage P, the motor speed is normally slowed somewhat while work is performed by the press tool in deforming the workpiece by pressing, stamping, punching etc. The pressing stage begins at a point of first impact I between die and workpiece and continues till Bottom Dead Centre (BDC), or thereabouts. Directly following the pressing stage the motor is accelerated again to a high or maximum speed in a fourth non-pressing stage and the maximum speed maintained during a fifth non-pressing stage. In a further and sixth non-pressing stage, the speed is reduced to zero in time to end the press cycle.

In a traditional speed profile for a mechanical press of the prior art, as shown in FIG. 3, the maximum motor speed is fixed for a traditional flywheel press to provide a fixed eccentric speed and pressing speed Wp. The improved mechanical press according to one aspect of the invention equipped with a variable speed motor may be accelerated to a higher speed than the pressing speed during the non-pressing stages of the press cycle. Thus the total cycle time for a production cycle of the press may be shortened (see also FIG. 5 regarding production cycle).

FIG. 4 also shows other aspects of the improved press production cycle, which are concerned with loading a blank or workpiece into the press and subsequently removing the workpiece after the pressing (stamping, punching etc) stage. At the start of the press cycle the press is open and a blank may be loaded. As the press begins to close in the pre-pressing stage there comes a point after which the press has closed to an extent that there is no longer sufficient clearance to load in a workpiece without damaging the press die, workpiece or the loader. This point, as measured in terms of crank angle, is called here the die protection angle, DP. (The point may otherwise be referenced in other terms such as of position in the press stroke, the linear distance from TDC or BDC between the ram and the die etc.) Correspondingly, there is also a point in a non-pressing stage following the pressing stage after which the press has opened sufficiently that the workpiece may be removed without damage to the workpiece or the die. This point, as measured in terms of crank angle, is called the Unload Cam angle. Unload cam angle (UC) is used here to mean the limiting point or time when the die is opening and has opened sufficiently to withdraw and unload the workpiece after forming. Both the die protection angle and the unload cam angle may vary to some extent between production of different articles, typically dependent both on the blank or workpiece used and on the depth to which the workpiece is drawn down over a die.

Thus in FIG. 4, the stages of the press cycle shown comprise pre-pressing stages, a pressing stage, and post-pressing stages. The press cycle may be described thus:
 a first non-pressing stage, normally accelerate so that maximum press speed W1 is reached at or close to DP;
 a second stage hold at maximum press speed of W1;
 third non-pressing stage reduce to Wp as late as possible;
 a pressing stage with target speed for pressing of eg Wp
 fourth non-pressing stage accelerate as fast as possible (normally) to W1;
 fifth non-pressing stage hold at high speed eg W1;
 sixth non-pressing stage reduce speed, normally starting close to UC.

The improved press cycle provided by the improved control method allows the total time for a production cycle to be shorter than the production cycle time of a traditional mechanical press of the prior art by shortening the time taken to carry out non-pressing parts of the press cycle between DP and UC. In particular, the time period from the latest loading point DP to the earliest unloading point UC, denoted as T2, may be shortened by means of running the drive motor at increased speeds WM1 to drive the eccentric at speeds greater than the pressing speed Wp and then reducing to eccentric speed Wp or, at the cycle end, reducing to zero. This is indicated schematically on the diagram by the difference in time for T2, ΔT2 in FIG. 4 as compared to FIG. 3 (Prior Art). Although the improved press cycle is mainly described in terms of a cycle or of separate cycles is may be applied to Single Stroke operation and/or to Continuous operation. In the latter case the press does not stop at all between production cycles.

Figure 5:
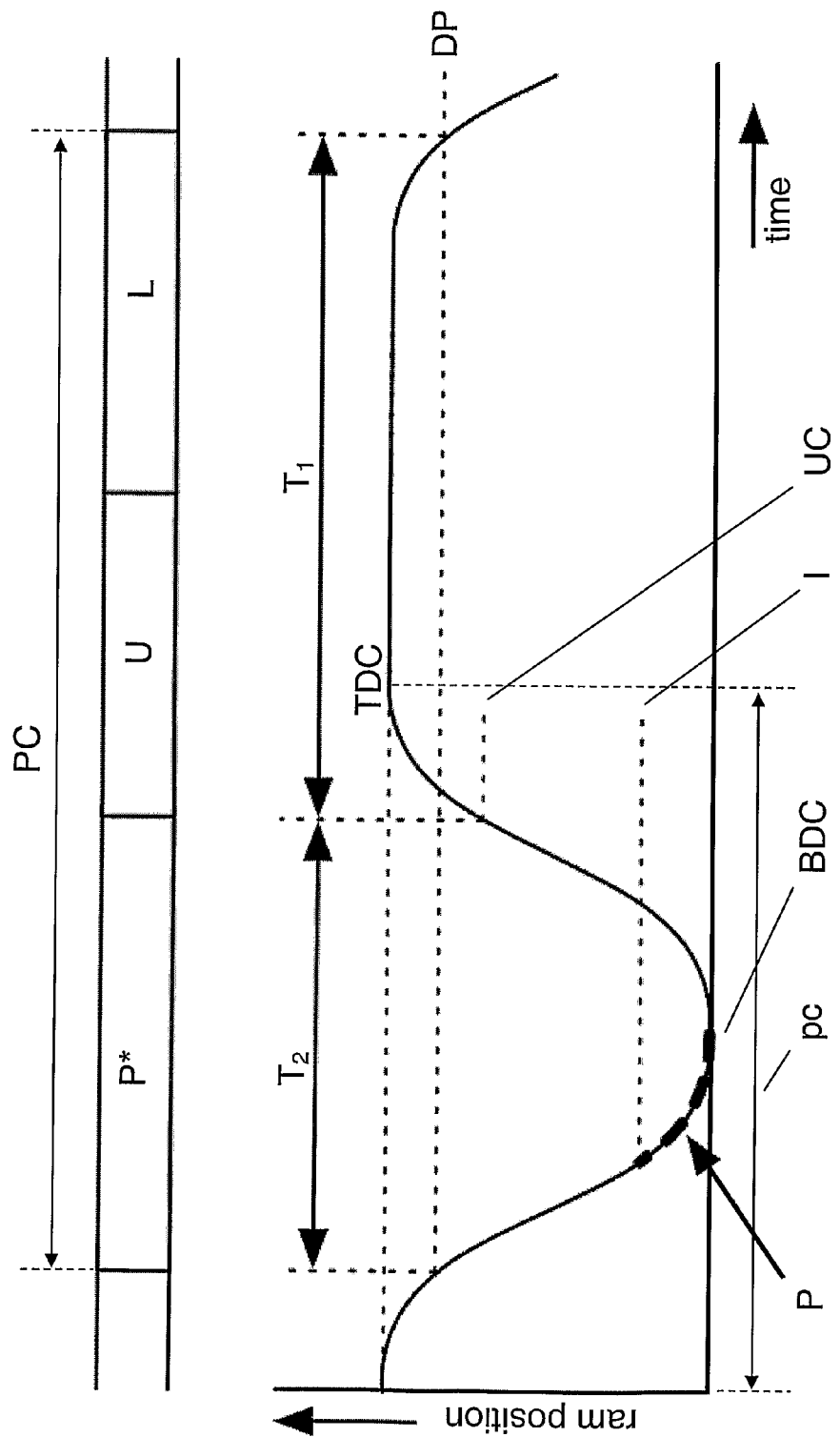
FIG. 5 (Prior Art) is a schematic position-time profile showing ram position against time according to a known press cycle.

FIG. 5 shows a position profile from the Prior Art. It shows a conventional 360 degree press cycle in terms of ram position against time. The press cycle pc and the production cycle PC are indicated. Production cycle PC comprises phases of P* pressing, U unloading and L loading. T2 is that part of the cycle that occurs between DP and UC. T2 may be defined in different ways. For example T2 is normally a time during which no loader or unloader is inside the press. Also, it is during a time period T2 beginning at the DP angle and ending with the UC angle that the stage P of the actual pressing (deforming) of the workpiece takes place. It may be seen that the Unloading U then Loading L stages of the conventional press cycle take a significant amount of time, the period $T_1$. The total time for a production cycle PC may also be expressed as $T_1+T_2$. In embodiments of the present invention a shorter time period $T_2$ is provided by increasing motor speed WM (and thus eccentric speed W and ram speed) in excess of pressing speed WMp, thus enabling a shorter production cycle time.

Figure 9:
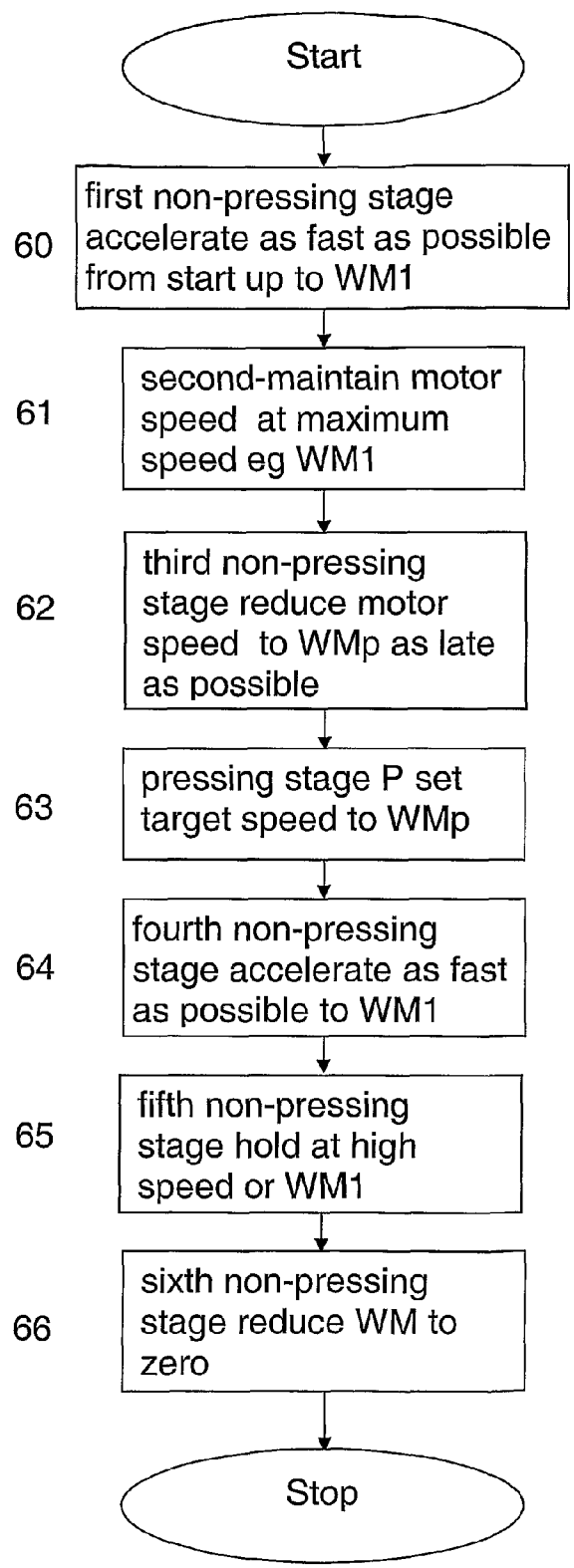
FIG. 9 is a schematic flowchart for an method to operate an improved mechanical press according to an embodiment of the invention.

FIG. 9 is a flowchart for a method to operate the improved mechanical press according to an embodiment of the invention. The method comprises a pressing stage and a plurality of non-pressing stages. The method may further be described as comprising pre-pressing stages, a pressing stage, and post-pressing stages. As may be seen above in the description in reference to FIG. 4 the method begins with:

60 accelerate, eg as fast as possible, from start up to WM1
61 maintain motor speed at maximum speed of WM1
62 reduce motor speed from WM1 to pressing speed WMp as late as possible
63 set motor target speed such as WMp for pressing stage P
64 fourth non-pressing stage accelerate eg as fast as possible to WM1
65 fifth non-pressing stage maintain motor speed at a maximum speed such as WM1 preferably until close to UC,
66 sixth non-pressing stage reduce to zero This method comprises steps to control the improved press so as to achieve a total production cycle which takes as little time as possible. Other constraints may be included or conditionally included in the above method as applied to a stand-alone press, for example to coordinate with loading/unloading requirements for the press or to optimise peak power and/or energy consumption for this press. This peak power and/or energy consumption may for example be optimised with regard to acceleration and regenerative braking during speed reduction periods. In for example the automobile industry such typical production volumes mean that the energy optimisation features of the improved press line may be very beneficial in, for example, reducing energy consumption. However the improved press line may also be used in other stamping, cutting, pressing or deep drawing applications where mechanical presses are to be found, such as in blanking or minting of coins, and certain furniture.

Figure 10:
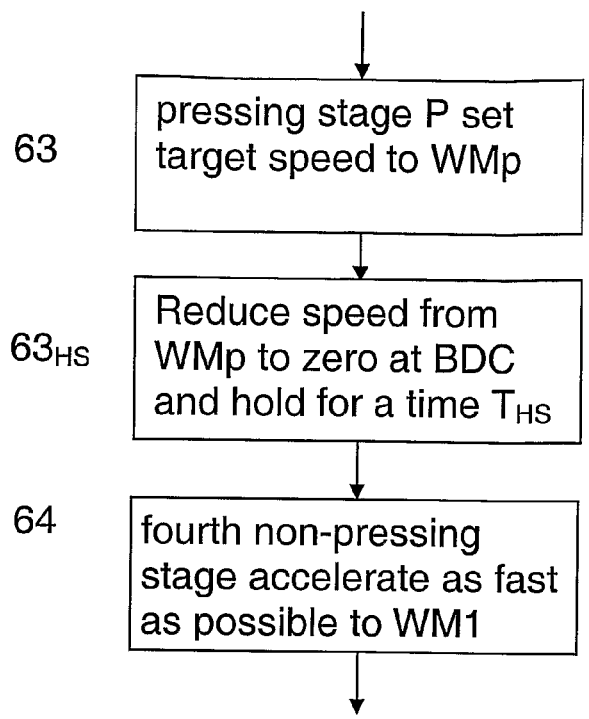
FIG. 10 is a schematic flowchart for an method to operate an improved mechanical press according to another embodiment of the invention.

FIG. 10 shows a variation of the method described in relation to the flowchart of FIG. 9. In certain operations, for example in hot stamping, it is desirable for the press to stop during the pressing stage and hold the workpiece under applied pressure for a period of time, indicated as $T_{HS}$. This standstill is normally carried out at the position of BDC, or thereabouts. It is a simple task to include one or more additional functional steps for control of the improved press according to one or more embodiments. FIG. 10 shows an extra stage $63_{HS}$ carried out during or after the pressing stage 63:

$63_{HS}$ reduce speed from WMp to zero and hold for a time $T_{HS}$.
64 accelerate motor to WM1 as fast as possible (or at a rate or rates according to another scheme).

Electrical energy consumption of the drive motor of a press may be improved or smoothed by use of regenerative braking. The motor may be decelerated to a reduced speed or to a zero speed by means in part of regenerative braking. For example a motor speed reduction during the first pre-pressing stage from WM1 to WMp, and a motor speed reduction after pressing from WM1 to zero. A system comprising an improved press according an embodiment of the invention may comprise energy recovery means for recovering energy from the press during for example, deceleration or braking. This may be any recovery means such as for example electrical, mechanical or chemical. This may involve use of one or more capacitors, batteries, mechanical device such as flywheels, mechanical springs or devices comprising a reservoir of a compressible fluid. The stored energy is principally reused during one or more of the following periods of the press cycle: initial acceleration at start of the press cycle; pressing; reacceleration after pressing. Recovered energy may also or instead be fed back to the supply grid. As well or instead of recovering energy during deceleration, energy may be recovered from a press movement that includes a change in kinetic energy of the system. For example, energy may be recovered during a time period in a press cycle comprising a change in the inertia of the system.

According to another embodiment of the invention, the drive motor of the press is controlled to operate the press in an improved press cycle which extends over greater than 360 degrees crank angle or equivalent when expressed in terms of a press opening distance. A conventional mechanical press has a press cycle of up to 360 deg and typically begins and ends at Top Dead Centre (TDC). FIG. 6a shows a standard press cycle of the Prior Art. It shows a 360 degree cycle in one rotational direction. The cycle starts and stops at 0/360 degrees. Relative positions for DP and UC are schematically indicated.

FIG. 6b shows an embodiment which permits a longer time for a motor to accelerate than the standard press cycle gives. The figure shows a press cycle which may begin and/or end at a position not equal to 0/360 or TDC.

FIG. 6c shows an embodiment in which the press operates bi-directionally. A clockwise cycle $S_C$, solid line, begins at Start 1 about 10 o'clock and continues clockwise to $DP_C$ at about 2 o'clock, round till $UC_C$ at about 10 o'clock and finishes at Stop 1 at about 2 o'clock. Depending on the process or product requirements start/stop positions may be closer to TDC than the positions shown in the figures, but rarely farther away than the UC angle. Similarly the press then rotates in a reverse direction, dashed line, beginning at Start 2 of about 2 o'clock and continuing anticlockwise to $DP_{AC}$ at about 11 o'clock, continues round to $UC_{AC}$ at about 2 o'clock and finishes at Stop 2 at about 10 o'clock which is the same position as the Start 1 position for the clockwise rotation.

FIG. 6d shows an alternative embodiment in which the press rotates in a first rotational direction through a press cycle greater than 360 degrees. At the end of the production cycle the press then reverses to the start position. FIG. 6d shows a Start at about 19 o'clock which runs clockwise, solid line, to $DP_C$ at about 1 o'clock, clockwise round to $UC_C$ at about 10 o'clock, continuing to finish at Stop at about 2 o'clock. The press then reverses $R_{AC}$ in an anticlockwise direction to the start position at around 10 o'clock. The start and stop position may be arranged symmetrically about TDC as shown in the above examples, or not; and the start and stop may also be placed closer to TDC then the figures schematically indicate. Start/stop is not usually placed further away from TDC than the UC angle or thereabouts.

Figure 7A:
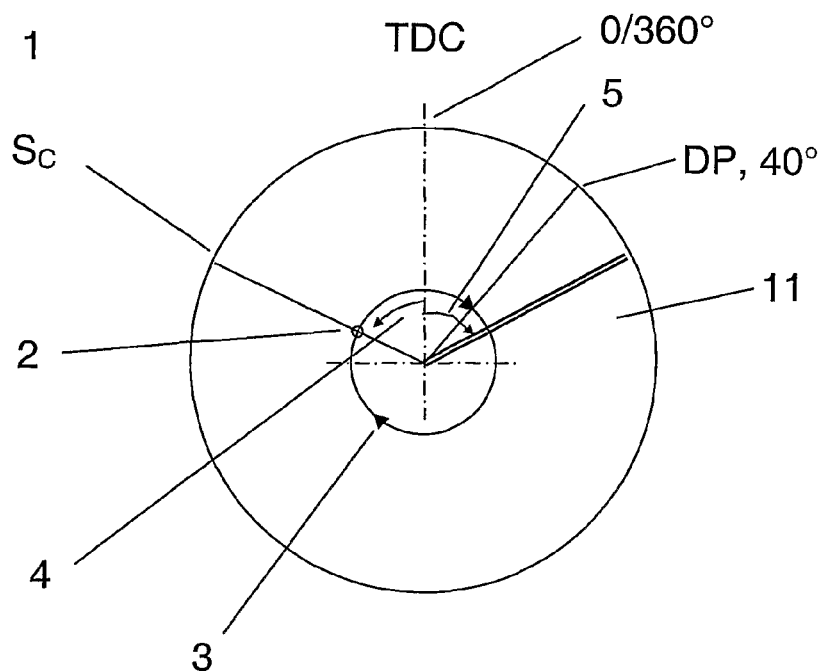
FIG. 7a is a schematic diagram showing a press cycle in relation to degree and rotation direction and 7b according to a bi-directional embodiment of the invention.

FIG. 7a shows schematically the improved press cycle diagrammed in terms of degrees of crank angle. FIG. 7a shows a press cycle 1 comprising a cycle $S_C$ in a first clockwise direction, see arrow 3. The cycle begins at point 2 starting at about 300 degrees, angle 4, and continues clockwise through greater than 360 degrees to a stop at about 60 degrees, angle 5.

Figure 7B:
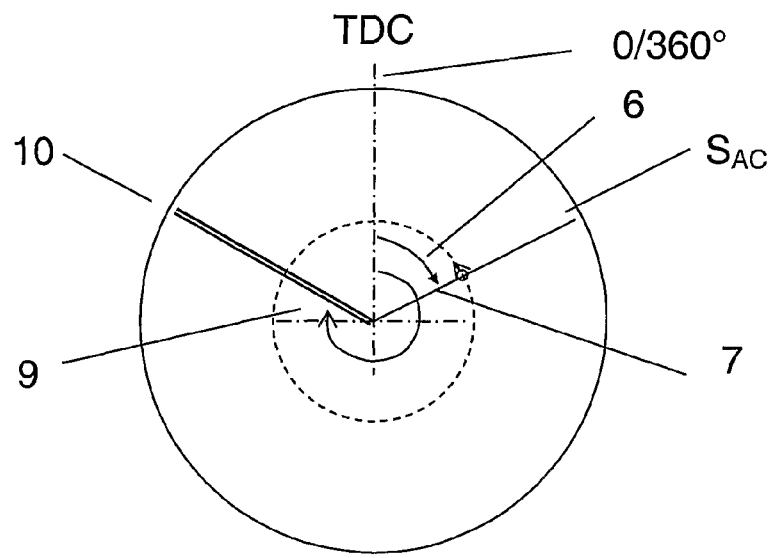

FIG. 7b shows a cycle in a second rotational direction, cycle SAC shown with a dashed line which starts at an angle δ of about 60 degrees and continues anticlockwise around over 360 degrees to a stop 10 at an angle 9 which may be about 300 degrees. The improved press cycle of the present embodiment extends over more than 360 degrees, and the rotational direction is changed on every operation. This is in contrast to the traditional methods with starting and stopping at the same position during every operation, typically at TDC, as is done with traditional mechanical presses.

Figure 8:
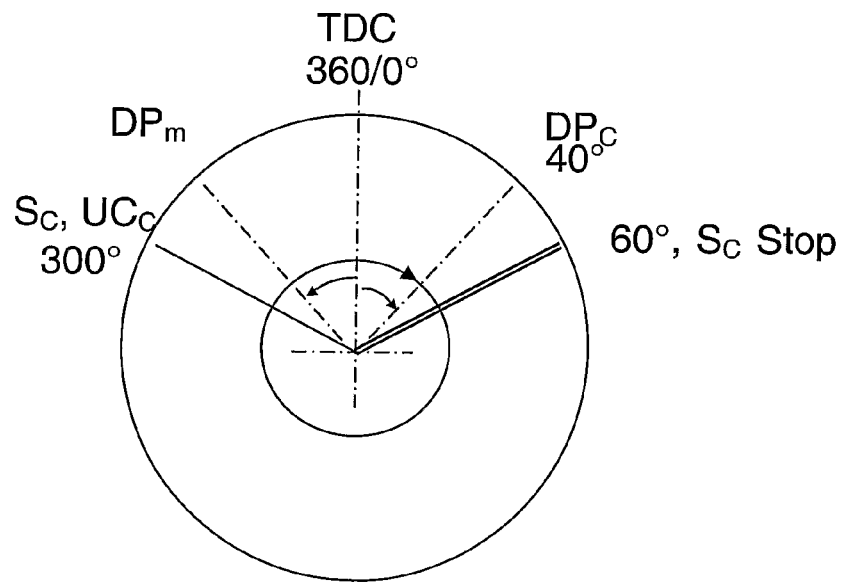
FIG. 8 is a schematic diagram showing the bi-directional press cycle in relation to positions for DP and UC angles.

An example of acceleration and deceleration points in terms of angles for the cycle of FIG. 7a or 7b are shown in FIG. 8. Thus, a first operation clockwise $S_C$ is performed for example starting at 300 degrees, accelerating until reaching 40 degrees (40 degrees is in this example also die-protection angle DP). Deceleration is started at 300 degrees, also indicated in this example as unload-cam angle UC, and the press is stopped at 60 degrees. The next operation is then started from 60 degrees, and accelerating in the Opposite rotation direction, anticlockwise, until 320 degrees, indicated as mirrored die-protection angle $DP_m$. Deceleration is started at 60 degrees which may also be the mirrored unload-cam angle until standstill at 300 degrees. Thus in FIGS. 7a, 7b and 8 the successive press cycles are greater than 360 degrees and the cycles in different directions start and stop at the same point, 60 degrees. Note that the exemplary first and second cycles illustrated in FIGS. 7a, 7b do not have to stop and start at the same point.

Using the above improved method the press system may be controlled so that the motor accelerates the press ram during 100 degrees or so (and decelerates during 120), which are greater extents compared to around 40 degrees of acceleration in a typical traditional mechanical press cycle (as in FIG. 6a) or an improved press cycle (as in FIG. 6b). Thus a motor with a given maximum torque output will be able to accelerate an inertia which may be about two times greater up to full speed. Greater inertia in turn makes more (kinetic) energy available for the actual pressing process, so that less energy has to come from the motor directly during the pressing part of the press cycle. This allows use of a smaller motor. Simulations have shown that bi-directional operation allows the use of a motor with 30% less torque for a given cycle time, compared to operations with a traditional or improved traditional press cycle.

In the example above the value of the unload-cam angle (60 degrees from top) was used as start and stop position for bi-directional operation. Whether or not this angle is used will also depend on the size of ancillary machinery, a loader/unloader or transfer device such as a robot, and size of the part versus depth of the press die. While a transfer device or robot without part can enter the press at this angle, a robot or transfer device with part may require a larger press opening. If so, for example, the die-protection angle (40 degrees from top for example) can be used as a start and stop position. In the example given, start of the first operation would thus be at 320 degrees, acceleration to 40, deceleration from 320, standstill at 40. Bi-directional operation still gives a large benefit compared to the traditional standard operation of mechanical presses.

Also depending on the press and the part, values of the die-protection angle and unload-cam angle can differ from the examples given here.

According to another embodiment of the present invention an improvement is provided to methods for operating a mechanical press comprising an electric drive motor wherein the press is moved backwards between successive press production cycles operations instead of changing rotation direction of press operation for every alternate cycle. This embodiment is particularly advantageous for presses which, due to design or other reasons, cannot be driven in reverse for a complete press cycle.

FIG. 7a shows schematically a press cycle $S_C$ with a start point 2 for, in this example, a clockwise rotation from a point 2, which is an angle 4 of about 300 degrees. The first cycle traverses clockwise through about 480 degrees to a cycle stop 11 with an angle 5 of approximately 60 degrees. At the end 11 of the first cycle the press is then rotated in a reverse rotational direction $R_{AC}$ back to the same start point $S_C$ as the previous pressing cycle.

The control and acceleration and/or deceleration of the improved press cycle with the same rotational direction per press cycle and reversing between each press cycle may be varied. For example the start and end positions of a press cycle may be varied. A press cycle may for example start at 300 degrees, accelerate clockwise through 100 degrees to 40 degrees and rotate through a forming phase. After pressing or forming, deceleration may begin at 300 degrees and may run through 100 degrees to a standstill occurring at 60 degrees. Then, in a time period during which for example, machines are unloading/loading the press, the press is moved backwards $R_{AC}$ from 60 degrees to 300 degrees, so that the next operation is then ready to be started again from 300 degrees, and once again in a clockwise or forward direction. This method is most effective when sufficient time is available for the backward motion during a dead time such as unloading/loading, so application may be somewhat more limited that for bi-directional operation, depending on the demands of the specific forming operation that is planned. However, a similar reduction of peak torque is made possible.

One or more microprocessors (or processors or computers) comprise a central processing unit CPU performing the steps of the methods according to one or more aspects of the invention, as described for example with reference to FIG. 9 or 10. The method or methods are performed with the aid of one or more computer programs, which are stored at least in part in memory accessible by the one or more processors. It is to be understood that the computer programs for carrying out methods according to the invention may also be run on one or more general purpose industrial microprocessors or computers instead of one or more specially adapted computers or processors.

The computer program comprises computer program code elements or software code portions that make the computer or processor perform the methods using equations, algorithms, data, stored values, calculations and the like for the methods previously described, for example in relation to FIG. 9, 10 and in relation to the speed profile of FIG. 4 and to the methods described in relation to FIGS. 6b-d, 7, 8 in respect of driving the press in more than one rotational direction. A part of the program may be stored in a processor as above, but also in a ROM, RAM, PROM, EPROM or EEPROM chip or similar or other suitable memory means. The or some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony Memory Stick™ and other removable flash memories, hard drives etc. may also be used. The program may also in part be supplied from a data network, including a public network such as the Internet. The computer programs described may also be arranged in part as a distributed application capable of running on several different computers or computer systems at more or less the same time.

A production system may include one or more improved presses according to one or more embodiments of the invention. For example one or more presses may be included in a press line, where a plurality of presses operate on the same or related products. A production may include a plurality of press lines comprising one or more improved presses according to one or more embodiments of the invention. In the production system context some of the optimisation and coordination methods described above to optimise for a single stand-alone press may be extended over the group of processes. Thus recovered energy for example may be consumed by other machines and not just one stand-alone improved press. Combined peak power of, or energy use by more than one machine may be optimised or coordinated, for example to reduce total peak power consumption or to reduce potentially disruptive peaking or spiking in power use. Such considerations for overall power use by a press line may also introduce constraints for acceleration, deceleration times etc that may be factored into the method such as that described in reference to FIG. 6. For example, to obtain the shortest possible time for a production cycle the press is accelerated such as in step 60 of FIG. 9 as fast as possible; but the acceleration may be varied to less than maximum to avoid an instantaneous power peak for the press line as a whole. The first acceleration to WM1, step 60, may not be linear, and may be arranged to match a time period, the amount of time need by a loader to insert the workpiece, and thus take at least a given time to reach the DP angle, rather than a maximum and/or straight line acceleration. Similarly, the regenerative braking that is normally carried out, such as in connection for example with steps 62, 66 of FIG. 9, may be arranged with constraints to provide return energy to any of the same press, another machine, the press line or the grid.

Such coordination or optimisation between presses may be arranged around other aspects of the improved press. For example when optimising a press line the start/stop positions in each press cycle running on each press which may be selected or adjusted. This allows greater freedom for arranging optimal overall production times for a press line.

It should be noted that while the above describes exemplifying embodiments of the invention, there are several variations and modifications which may be made to the disclosed solution without departing from the scope of the present invention as defined in the appended claims.

REFERENCES

1. High-tech presses, Servo technology meets mechanical presses by Dennis Boerger, Stamping Journal November 2003, thefabricator.com

The invention claimed is:

1. A method for operating a mechanical press comprising at least one electric drive motor, a drive control for controlling at least one said motor, a ram, a mechanical element for operating said press to carry out a press cycle including a pressing part and one or more non-pressing parts of said press cycle, the method comprising:
    connecting the motor to the mechanical element and connecting the mechanical element to the ram; and
    providing a control output to said drive control such that a speed of the at least one said drive motor is varied during at least one said pressing or non-pressing part of said press cycle, such that the speed of the at least one drive motor is continuously variable up to a speed that is greater than a pressing speed of the press, wherein at least one of initiating or terminating rotation of a crank of the press at a position other than top dead center, wherein a point of at least one of initiating or terminating rotation of the crank is variable, wherein during the press cycle the crank is rotated up to an angle of rotation that is greater than 360 degrees, wherein the crank is rotated in at least one of a positive or negative direction.

2. The method according to claim 1, wherein the speed of said drive motor during the at least one pressing or non-pressing part of a said press cycle is controlled to vary and is greater than the speed of said drive motor during said pressing part of the said press cycle.

3. The method according to claim 1, wherein a torque of said drive motor during the at least one pressing or non-pressing part of a said press cycle is controlled.

4. The method according to claim 1, wherein the speed of said drive motor during the at least one part of a press cycle before pressing is controlled to vary and is greater than the speed of said drive motor during said pressing part of the press cycle.

5. The method according to claim 1, wherein the speed of said drive motor during the at least one part of a press cycle after pressing is controlled to vary and is greater than the speed of said drive motor during said pressing part of the press cycle.

6. The method according to claim 1, wherein each complete said press cycle carried out in said first rotation direction of a production cycle extends over more than 360 degrees of crank angle or eccentric rotation.

7. The method according to claim 1, wherein each complete press cycle carried out in said first rotation direction comprises a step of reversing said drive motor at the end of each complete press cycle and operating in a second rotational direction.

8. The method according to claim 1, wherein said drive motor is accelerated in the first rotation direction from a start up position which is not equal to Top Dead Centre or 0/360 degrees.

9. The method according to claim 1, wherein said drive motor is accelerated by said drive control means during a first part of the press cycle and before reaching a position dependent on a position of a die protect angle relative the die and the workpiece.

10. The method according to claim 1, wherein the speed of said drive motor is maintained at a high or maximum speed greater than the motor speed during pressing for a period of time.

11. The method according to claim 1, wherein the speed of said drive motor is reduced before the press reaches the position of first impact between the die and the workpiece.

12. The method according to claim 11, wherein by providing a control output to said drive control means wherein the motor speed is reduced from a speed to a pressing speed before the position of first impact between the die and the workpiece.

13. The method according to claim 1, wherein by providing a control output said drive control means wherein said motor speed is variable when the press opening is between the position of first impact and bottom dead center.

14. The method according to claim 1, wherein the drive motor speed is variably controlled to slow down the speed of the press during a said pressing part of a press cycle before bottom dead center or thereabouts.

15. The method according to claim 1, wherein by providing a control output to said drive control means wherein said motor is decelerated and the press maintained at a standstill upon reaching bottom dead center, or thereabouts, for a period of time.

16. The method according to claim 1, wherein the drive motor speed is variably controlled to accelerate the speed of the press from standstill till a slow speed during a said pressing part of a press cycle after bottom dead center or thereabouts.

17. The method according to claim 1, wherein by providing a control output to said drive control means wherein said motor is accelerated after pressing the workpiece or after reaching bottom dead center or thereabouts.

18. The method according to claim 1, wherein said motor is decelerated from a deceleration position dependent on a position of an unload cam angle of the press cycle.

19. The method according to claim 6, wherein said motor is decelerated and the press cycle in the first rotation direction ends at a position where the crank angle is greater than 360 degrees, or after passing top dead center for a second time.

20. The method according to claim 1, wherein said motor is controlled to move said ram to a cycle start position for each press cycle which is a plurality of degrees of crank angle backwards in a second rotation direction from the stop position of the previous press cycle.

21. The method according to claim 20, wherein said motor is controlled such that the press reverses from the first rotation direction to the second rotation direction over a plurality of degrees between the end of a first press cycle and the start of a second press cycle.

22. The method according to claim 1, wherein said motor is controlled such that said motor rotational motion reverses direction from the first rotation direction to a second and opposite rotation direction between each successive and complete press cycle.

23. The method according to claim 22, wherein said motor is accelerated from a start position before passing top dead center, or 0/360 degrees crank angle position in the first rotation direction during a first press cycle and also accelerated from a start position of before passing top dead center, or 0/360 degrees crank angle position during a second press cycle in the second and opposite rotation direction.

24. The method according to claim 23, wherein said motor is decelerated from a deceleration position before passing top dead center, or 0/360 degrees crank angle position in the first rotation direction during the first press cycle and also decelerated from a deceleration position before passing top dead center, or 0/360 degrees crank angle position, during a second press cycle in the second and opposite rotation direction.

25. The method according to claim 1 wherein an inertia of the rotating mass is adapted by an element configured to vary inertia of a moving part of the press.

26. The method according to claim 25, wherein the variation in the inertia of a moving part of the press is carried out on-line or off-line by engaging or disengaging a clutch or coupling device.

27. The method according to claim 26, wherein the element configured to vary the inertia, or to provide inertia in the form of a moving part that may be coupled in or decoupled from the press is driven by a motor.

28. The method according to claim 1, wherein the at least one said motor is decelerated to a reduced speed or a zero speed in part by regenerative braking.

29. The method according to claim 1, wherein the drive motor speed is variably controlled to slow the press down upon reaching Unload Cam or thereabouts for a period of time for synchronization purposes and re-accelerate the press before reaching the Die Protect position or thereabouts of the next press cycle.

30. The method according to claim 1, wherein the drive motor speed is variably controlled to operate the press in a continuous operation without stopping the press between successive press cycles.

31. The method according to claim 1, wherein the drive motor speed is controlled to optimise or minimise for the press any from the group of: peak power consumption, energy consumption, cycle time, any combination.

32. The method according to claim 1, wherein the drive motor speed is controlled to optimise, minimise or reduce noise, audible noise, and/or vibration of the press.

33. The method according to claim 1, wherein the mechanical press is operated with a single stroke or continuous operation to carry out of any operation selected from the group of: pressing, bending, forming, stamping, hot stamping, deep drawing, blanking, cutting, punching.

34. The method according to claim 1, further comprising: coordinating operation of the mechanical press with operation of a press line.

35. A mechanical press, comprising:
at least one electric drive motor,
a drive control for controlling said motor, wherein the control is configured to vary a speed of the at least one electric drive motor during at least one pressing or non-pressing part of a press cycle,
a ram, and
a mechanical element configured to operate said press to carry out a press cycle, the mechanical element including a pressing part and one or more non-pressing parts of said press cycle,
wherein the speed of the at least one electric drive motor is continuously variable up to a speed that is greater than a pressing speed of the press, wherein at least one of initiating or terminating rotation of a crank of the press at a position other than top dead center, wherein a point of at least one of initiating or terminating rotation of the crank is variable, wherein during the press cycle the crank is rotated up to an angle of rotation that is greater than 360 degrees, wherein the crank is rotated in at least one of a positive or negative direction.

36. The mechanical press according to claim 35, wherein the control is configured to vary the speed of said drive motor during at least one non-pressing part of a said press cycle.

37. The mechanical press according to claim 35, wherein the control is configured to control the torque of said drive motor during the at least one pressing or non-pressing part of a said press cycle.

38. The mechanical press according to claim 35, wherein the control is configured to vary the speed of said drive motor during at least one said non-pressing part of the cycle and may be greater than the speed of said drive motor during said pressing part of the press cycle.

39. The mechanical press according to claim 35, further comprising:
an inertia element mechanically coupled in a drive chain from motor to link or other linkage to press ram.

40. The mechanical press according to claim 39, wherein the inertia element comprises any from the group of: low-inertia flywheel, high inertia drive motor, high inertia gearbox.

41. The mechanical press according to claim 39, wherein a variation in the inertia of a moving part of the press is carried out on-line or off-line by engaging or disengaging a clutch or coupling device.

42. The mechanical press according to claim 41, wherein the inertia element is driven by a motor.

43. The mechanical press according to claim 35, wherein said press cycle of a production cycle comprises a movement of the press in a first rotation direction of greater than 360 degrees.

44. The mechanical press according to claim 35, wherein said motor is reversible and operable in either of said first or a second rotational direction.

45. The mechanical press according to claim 35, wherein the rotational direction of the motor may be reversed after the first production cycle.

46. The mechanical press according to claim 35, further comprising:
a position sensor for determining a crank rotation angle of the press and/or a position of said ram.

47. The mechanical press according to claim 46, wherein said position sensor determines a crank rotation angle or position in either or both of a first forward rotation direction or a second reverse rotation direction.

48. The mechanical press according to claim 35, wherein said mechanical element translates rotational motion of the at least one said motor to linear motion of said ram and comprises any transmission type from the group of: crank, knuckle, link, cam, screw, ball screw, rack-type mechanism.

49. The mechanical press according to claim 35, wherein said press comprises two or more electric drive motors each arranged with an eccentric wheel or other mechanical means in order to drive said press.

50. The mechanical press according to claim 35, further comprising:
   a speed measuring element configured to measure a speed of said drive motor.

51. The mechanical press according to claim 35, further comprising:
   a clutchless transmission between the drive motor and the press ram.

52. The mechanical press according to claim 35, wherein said control controls the motor during successive said press production cycles to drive the press at speeds which may vary during one or more parts of any one said press production cycle, such that the time taken to complete each successive said production cycles may not be identical.

53. The mechanical press according to claim 35, further comprising:
   an energy regeneration element configured to recover energy during, for example, braking or deceleration.

54. The mechanical press according to claim 35, further comprising:
   a sensor arranged with or in said motor for determining a position or speed of a shaft of said motor.

* * * * *